United States Patent
Bohori et al.

(10) Patent No.: US 8,174,134 B2
(45) Date of Patent: May 8, 2012

(54) SYSTEMS FOR CONTACTLESS POWER TRANSFER

(75) Inventors: Adnan Kutubuddin Bohori, Bangalore (IN); Somakumar Ramachandrapanicker, Bangalore (IN); Suma Memana Narayana Bhat, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/914,512

(22) Filed: Oct. 28, 2010

(65) Prior Publication Data
US 2011/0140429 A1    Jun. 16, 2011

(51) Int. Cl.
F03D 5/04    (2006.01)
H02K 33/00    (2006.01)

(52) U.S. Cl. .......................... 290/1 R; 310/171

(58) Field of Classification Search ............ 290/1 R, 290/1 A, 7; 310/171, 40 R
See application file for complete search history.

(56) References Cited

U.S. PATENT DOCUMENTS

| | | | | |
|---|---|---|---|---|
| 3,932,803 A | * | 1/1976 | Buck | 327/497 |
| 5,939,793 A | * | 8/1999 | Masberg et al. | 290/38 R |
| 6,034,446 A | * | 3/2000 | Kowalski et al. | 307/112 |
| 6,657,351 B2 | * | 12/2003 | Chen et al. | 310/171 |
| 6,960,968 B2 | | 11/2005 | Odendaal et al. | |
| 7,323,964 B1 | | 1/2008 | Shyu et al. | |
| 7,717,619 B2 | | 5/2010 | Katcha et al. | |
| 7,944,069 B2 | * | 5/2011 | Uchiyama | 290/44 |
| 2008/0265684 A1 | | 10/2008 | Farkas | |
| 2010/0066340 A1 | | 3/2010 | Delforge | |
| 2011/0018198 A1 | * | 1/2011 | Prasanna | 273/237 |
| 2011/0121773 A1 | * | 5/2011 | Schmidt et al. | 318/716 |

FOREIGN PATENT DOCUMENTS

| | | |
|---|---|---|
| JP | 2009106136 A | 5/2009 |
| WO | 2007008646 A2 | 1/2007 |
| WO | 2009147574 A1 | 12/2009 |

OTHER PUBLICATIONS

Hiroyuki Kumagai; "Contactless Rotary Electrical Couplings", Ames Research Center, Moffett Field, California, http://www.techbriefs.com/component/content/article/918-photonics/5327-arl-0045, Mar. 1, 2003, reference ARC-12072, 3 Pages.

Adnan Bohori et al.; Title: Contactless Power Transfer System; Filed on Apr. 28, 2011; U.S. Appl. No. 12/845,133; 24 Pages.

(Continued)

*Primary Examiner* — Nicholas Ponomarenko
(74) *Attorney, Agent, or Firm* — Ann M. Agosti

(57) ABSTRACT

A system includes a first coil mechanically coupled to a first component and electrically coupled to a power source. The system further includes a second coil mechanically coupled to a second component and configured to receive power from the first coil via a magnetic field. At least one of the first and second components includes a rotatable component. The system also includes a field focusing element disposed between the first coil and the second coil and configured as a self resonant coil having a standing wave current distribution to focus the magnetic field onto the second coil and enhance the coupling between the first coil and the second coil.

20 Claims, 3 Drawing Sheets

OTHER PUBLICATIONS

Adnan Bohori et al.; Title: Contactless Power Transfer System; Filed on Jul. 28, 2010; U.S. Appl. No. 13/096,372; 34 Pages.

Adnan Bohori et al; Title: Power Transfer System and Method; Filed on: Jun. 24, 2010; U.S. Appl. No. 12/822,232; 19 Pages.

Stephen Paul Fenton et al.; Title: Electrical Coupling Apparatus and Method; Filed on: May 12, 2010; U.S. Appl. No. 12/778,475; 12 Pages.

Adnan Bohori et al; Title: System and Method for Contactless Power Transfer in Portable Image Detectors; Filed on: May 13, 2011; U.S. Appl. No. 13/149,170; 19 Pages.

Adnan Bohori et al; Title: Contactless Power Transfer System; Filed on: Jun. 22, 2010; U.S. Appl. No. 12/820,208; 18 Pages.

Adnan Bohori et al; Title: Contactless Power Transfer System and Method; Filed on: Mar. 25, 2010; U.S. Appl. No. 12/731,497; 27 Pages.

Adnan Bohori et al; Title: System and Method for Contactless Power Transfer in Implantable Devices; Filed on: Mar. 21, 2011; U.S. Appl. No. 13/052,196; 21 Pages.

Aristeidis Karalis, J.D. Joannopoulos, Marin Soljac; Title: Efficient wireless non-radiative mid-range energy transfer; Annals of Physics 323 (2008) 34-48.

Shahrzad Jalali Mazlouman, Alireza Mahanfar, Bozena Kaminska; Title: Mid-range Wireless Energy Transfer Using Inductive Resonance for Wireless Sensors; 6 Pages.

* cited by examiner

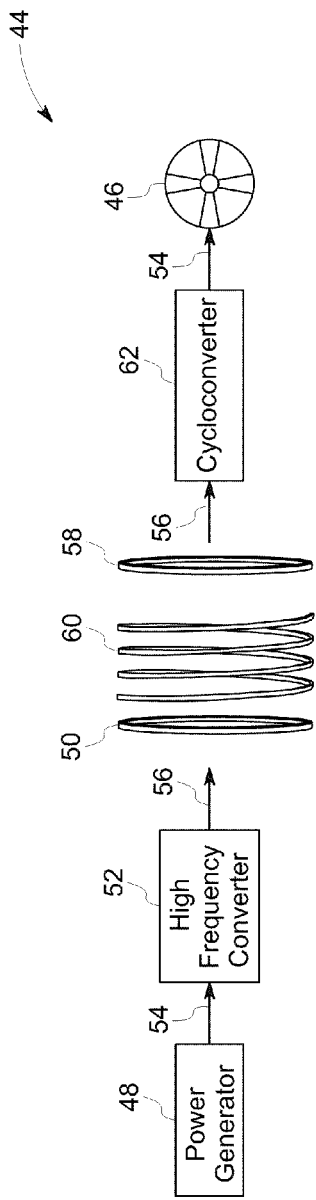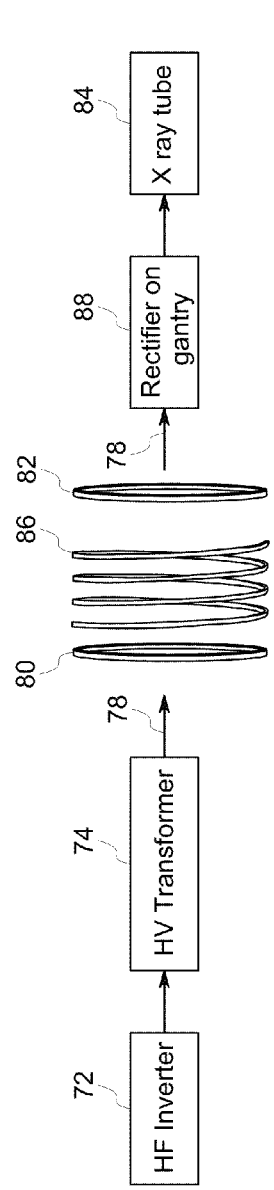

SYSTEMS FOR CONTACTLESS POWER TRANSFER

BACKGROUND

Embodiments of the present invention relate generally to contactless power transfer systems and more particularly to systems for contactless power transfer between components wherein at least one of the components is rotating.

Mechanical slip rings are often employed to transfer electrical power between rotatable components of machines. Slip rings are metal rings mounted on rotatable components of machines which are in electrical contact with stationary components of machines through conductive brushes of the stationary contacts. Slip ring sizes and materials are application specific, and regular maintenance of slip rings is required to ensure uninterrupted operation of the machine as mechanical damage may occur.

Rotary transformers are alternatively used in some applications to provide contactless power transfer between rotatable components. A rotary transformer includes two rotating inductive coils and works on the principle of induction coupling to transfer power from one coil to another. Rotary transformers operating at power frequencies of 50 Hz or 60 Hz are bulky and heavy. One way of reducing the size of a rotary transformer is to operate the transformer at high frequencies and couple resonant tank circuits to primary and secondary windings of the transformer.

However, upon reduction of rotary transformer size, the efficiency of the rotary transformer becomes more sensitive to changes in the gap between the primary and secondary windings of the transformer or load variations in the machine. In other words, any change in the air gap between the two coils reduces the magnetic field coupling and results in reduced efficiency of the rotary transformer.

Hence, there is a need for an improved system and method to address the aforementioned issues.

BRIEF DESCRIPTION

In one embodiment of the present invention, a system for contactless power transfer is provided. The system includes a first coil mechanically coupled to a first component and electrically coupled to a power source, wherein the first coil is configured to produce a magnetic field. The system further includes a second coil mechanically coupled to a second component and configured to receive power from the first coil via the magnetic field. At least one of the first and second components includes a rotatable component. The system also includes a field focusing element disposed between the first coil and the second coil and configured as a self resonant coil having a standing wave current distribution to focus the magnetic field onto the second coil and enhance the coupling between the first coil and the second coil.

In another embodiment of the invention, a turbine includes a contactless power transfer system configured to transfer power to a blade pitch motor from a power generator. The turbine includes a first coil coupled to the power generator of the turbine. The first coil is configured to produce a magnetic field. The turbine further includes a second coil coupled to the blade pitch motor of the turbine. The second coil is configured to receive power from the first coil via the magnetic field. The turbine also includes a field focusing element disposed between the first coil and the second coil and comprising at least one resonator configured to focus a magnetic field onto the second coil and form a standing wave current distribution.

In yet another embodiment of the invention, a computed tomography machine includes a contactless power transfer system configured to transfer power to an X ray tube from a power source. The computed tomography machine includes a first coil coupled to a high voltage transformer. The first coil is configured to produce a magnetic field. The computed tomography machine further includes a second coil coupled to the X ray tube. The second coil is configured to receive power from the first coil via the magnetic field. The computed tomography machine also includes a field focusing element disposed between the first coil and the second coil comprising at least one resonator configured to focus a magnetic field onto the second coil and form a standing wave current distribution.

DRAWINGS

These and other features, aspects, and advantages of the present invention will become better understood when the following detailed description is read with reference to the accompanying drawings in which like characters represent like parts throughout the drawings, wherein:

FIG. 4 is a schematic representation of a turbine including the contactless power transfer system of FIG. 1 in accordance with an embodiment of the invention.

FIG. 5 is a schematic illustration of a computed tomography machine including the contactless power transfer system of FIG. 1 in accordance with an embodiment of the invention.

DETAILED DESCRIPTION

Embodiments of the present invention include a contactless power transfer system, a turbine including a contactless power transfer system configured to transfer power to a blade pitch motor from a power generator, and a computed tomography machine including a contactless power transfer system configured to transfer power to an X ray tube from a power source.

The contactless power system includes a first coil coupled to a first component and coupled to a power source and a second coil coupled to a second component. At least one of the first and second components comprises a rotatable component. The first coil is configured to produce a magnetic field, and the second coil is configured to receive power from the first coil via the magnetic field. The contactless power transfer system also includes a field focusing element disposed between the first coil and the second coil and configured as a self resonant coil having a standing wave current distribution to focus the magnetic field onto the second coil and enhance the coupling between the first coil and the second coil. As used herein, the terms "a" and "an" do not denote a limitation of quantity, but rather denote the presence of at least one of the referenced item.

Figure 1:
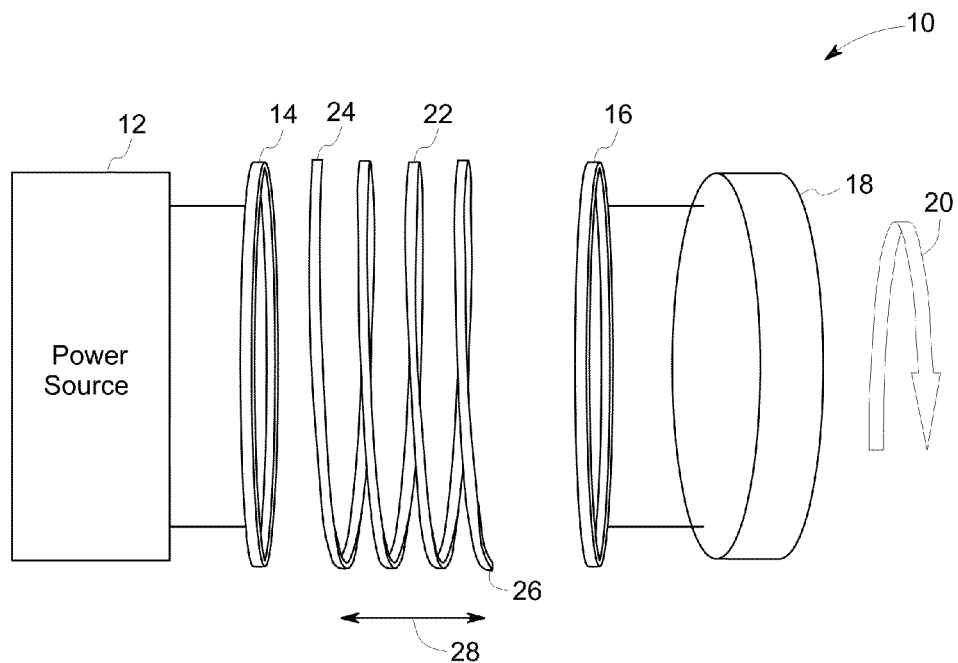
FIG. 1 is a schematic representation of a contactless power transfer system for a rotatable component in accordance with an embodiment of the invention.

FIG. 1 is a schematic representation of a contactless power transfer system 10 between a first component (not shown) and a second component 18 in accordance with an embodiment of the invention. In an exemplary embodiment, the first component comprises a stationary component, and the second component comprises a rotatable component. The contactless power transfer system 10 includes a power source 12 electrically coupled to a first coil 14 and configured to transfer power to the first coil 14. The first coil 14 is coupled to the first component and is configured to produce a magnetic field. The magnetic field is focused onto a second coil 16 coupled to the rotatable component 18 and configured to receive power from the first coil 14 via the magnetic field. In one embodiment, the rotatable component 18 is configured to rotate with respect to the stationary component along an axis of rotation 20. The rotatable component 18 may include one rotatable shaft or a plurality of rotatable shafts. The magnetic field is focused onto the second coil 16 by a field focusing element 22 disposed between the first coil 14 and the second coil 16. The field focusing element 22 comprises a self resonant coil having a standing wave current distribution that enhances the coupling between the first coil 14 and the second coil 16. In an exemplary embodiment the field focusing element 22 may include a fixed or a rotatable field focusing element.

The power source 12 may comprise, for example, a single phase AC power generator, a three phase AC power generator, or a DC power generator in combination with power conversion electronics to convert the power to a higher frequency. When the first coil 14 is excited at the resonant frequency of the field focusing element 22, the standing wave current distribution is developed within the field focusing element 22 between two open ends 24, 26 of the field focusing element 22. The standing wave current distribution leads to a non uniform magnetic field distribution around the field focusing element 22. Such non-uniform current distribution may be configured to focus the magnetic field in a desired direction, such as, in a direction of the second coil 16. When operating at resonant frequency, even a small excitation to field focusing element 22 produces a large amplitude of current distribution along the length 28 of the field focusing element 22. A large current magnitude of non-uniform distribution leads to an amplified and focused magnetic field in the direction of second coil 16 that results in higher efficiency of power transfer. In one embodiment, the field focusing element 11 includes at least one resonator. In a more specific embodiment, the at least one resonator includes an axially symmetric structure configured to focus the magnetic field along an axis of rotation.

Figure 2:
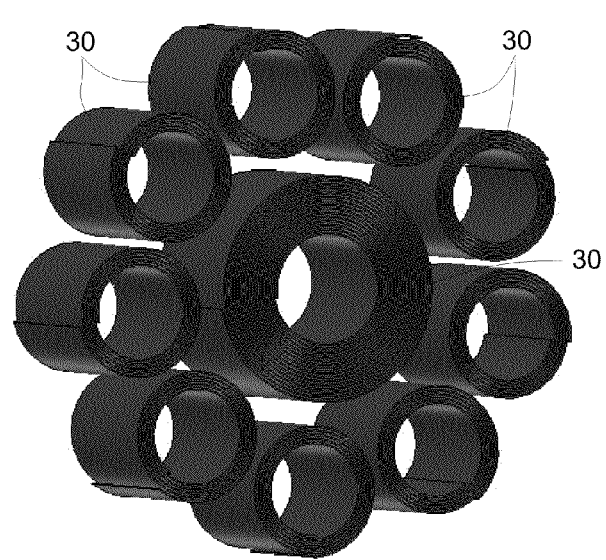
FIG. 2 is a schematic illustration of a field focusing element including an array of a plurality of Swiss roll shaped resonators for use in the contactless power transfer system of FIG. 1 in accordance with an embodiment of the invention.

FIG. 2 is a schematic representation of the field focusing element 22 including a plurality of resonators 30 arranged in an array for use in the contactless power transfer system 10 of FIG. 1 in accordance with one embodiment of the invention. In one embodiment of the array, each of the at resonators 30 is configured as a self resonant coil with a standing wave current distribution. In a more specific embodiment, individual resonators or sets of resonators may each be designed to be excited at a particular phase which may be the same for each resonator in one embodiment or may different between different resonators or sets of resonators in other embodiments. It may be appreciated that, when exciting resonators or sets of resonators at different phases, the field focusing may be enhanced in the desired direction. When multiple resonators are used, the total field of the array is determined by the vector addition of the fields from individual resonators. When parameters of the individual resonators 30 or resonator sets are varied, such variations may be selected to shape the overall field pattern of the array 32. Different ways to provide variation include, for example, geometrical configurations (linear, circular, rectangular, spherical, etc.), relative displacement distances between the resonators 30, excitation amplitudes of the individual resonators 30, excitation phases of the individual resonators 30, and patterns of the individual resonators 30. In one arrangement, fields from resonators 30 in the array 32 interfere constructively (add) in a desired direction to achieve magnetic field focusing and interfere destructively (cancel each other) in the remaining space. In the illustrated embodiment, individual resonators are arranged in a circle with one larger resonator in the center and smaller resonators surrounding the larger resonator.

In yet another embodiment, a first set of resonators is configured for one particular resonance frequency and a second set of resonators is configured for another resonance frequency in order for power to be simultaneously transferred through the first set of resonators and data to be transferred through the second set of resonators. In another embodiment, for bi-directional power transfer, a first set of resonators is configured for one particular resonance frequency and a second set of resonators is configured for another resonance frequency in order for power to be transferred through the first set of resonators in one direction via first resonator set and power to be transferred in an opposite direction via the second set.

In another embodiment, a single resonator may be excited while the other resonators are electromagnetically coupled to the excited resonator to form a passive array. Such passive arrays generate an elongated magnetic field focusing beam that enables efficient power transfer up to a few meters of distance.

In another embodiment, none of the resonators 30 are specifically excited. However, when the resonators are collectively placed near a magnetic field, the array 32 will focus the magnetic field. Spatial disposition of such passive structures may be designed to result in effective negative permeability.

If desired, a resonator or an array of resonators can be embedded in a material having high dielectric constant (dielectric permittivity) or a magnetic material having high permeability or magneto-dielectric medium having high dielectric permittivity and high permeability to achieve a lower resonant frequency with a smaller sized resonator. High permeability material enhances self-inductance of the resonator, and high permittivity material enhances self-capacitance of the resonator to reduce the frequency of resonance. In another embodiment, high permeability materials are also configured to increase the coupling between the primary coil, the field focusing element, and the secondary coil. One example material comprises barium strontium titanate.

Figure 3:
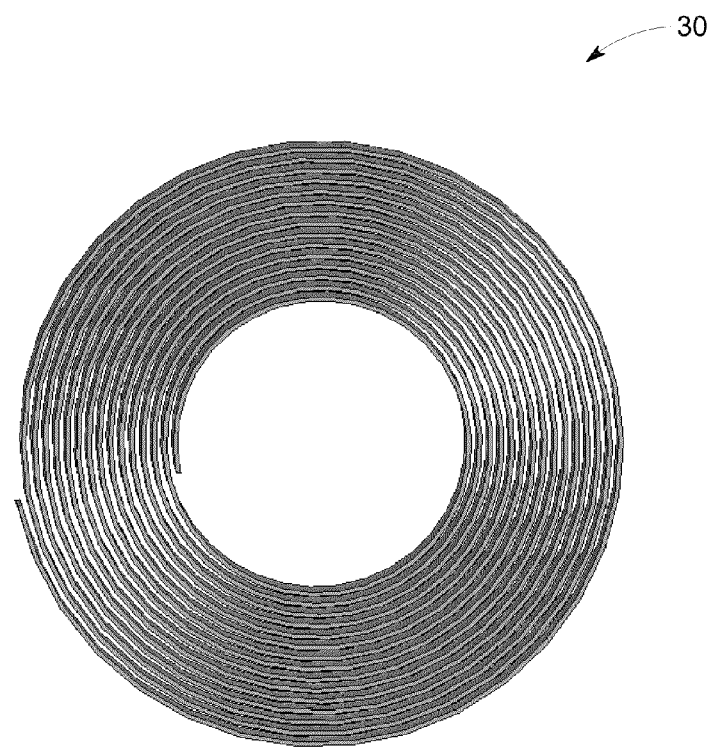
FIG. 3 is a schematic representation of a sectional view of at least one resonator configured to form the field focusing element for use in the embodiment of FIG. 2 in accordance with an embodiment of the invention.

FIG. 3 is a sectional view of one resonator 30 of the array 32 of FIG. 2 In the embodiment of FIG. 3, the resonator 30 includes an axially symmetric structure configured to focus the magnetic field along an axis of rotation. Such a resonator may comprise, for example, a Swiss roll shaped structure, a helical structure, or a spiral structure. Such resonators may be configured to operate at frequencies from about 100 kHz up to about 100 MHz and be used to provide extended magnetic field focusing strength in the contactless power transfer system 10. The efficiency of such resonators is expected to be unaffected by deviations in the relative position of the first coil and the second coil as long as the offset between the center point of the first coil and the second coil is less than the diameter of the first coil or the field focusing element.

FIG. 4 is a schematic representation of a turbine 44 including the contactless power transfer system 10 of FIG. 1 configured to transfer power to a blade pitch motor 46 from a power generator 48 in accordance with an embodiment of the invention. In one embodiment, the turbine 44 comprises a wind turbine. In another embodiment, the turbine 44 comprises a marine hydrokinetic energy turbine. The power generator 48 is electrically coupled to a first coil 50 and configured to provide input power to the first coil 50. In one embodiment, the power generator 48 is electrically coupled to a high frequency converter 52 that converts low frequency input power 54 to high frequency input power 56 that is fed to the first coil 50. The first coil 50 generates a magnetic field from the high frequency input power. The magnetic field is focused onto a second coil 58 coupled to the blade pitch motor 46 of the turbine 44. The second coil 58 receives the power from the first coil 50 through the magnetic field. The magnetic field is focused onto the second coil 58 by a field focusing element 60 disposed between the first coil 50 and the second coil 58 including at least one resonator configured to focus the magnetic field on to the second coil 58 upon excitation and form a standing wave current distribution. In one embodiment the field focusing element 60 comprises a rotating field focusing element.

In the embodiment of FIG. 4, a cycloconverter 62 is provided between the second coil 58 and the blade pitch motor 46. The cycloconverter 62 receives the high frequency power 56 from the second coil 58 and converts the high frequency power 56 received from the second coil 58 to a lower frequency power 54 that is further transmitted to the blade pitch motor 46.

FIG. 5 is a schematic illustration of a computed tomography machine 70 including the contactless power transfer system 10 of FIG. 1 in accordance with an embodiment of the invention. The computed tomography machine 70 includes a power source (not shown) electrically coupled to a high frequency inverter 72 configured to convert a low frequency input power from the power source to a high frequency input power. The high frequency inverter 72 is electrically coupled to a high voltage transformer 74. In one embodiment the high voltage transformer 74 includes a step up transformer. The high voltage transformer 74 converts a low voltage input power to a high voltage input power 78. The high voltage input power 78 is provided to a first coil 80 electrically coupled to the high voltage transformer 74. The first coil 80 generates a magnetic field based on the received high frequency, high voltage input power 78. The magnetic field is focused towards a second coil 82 which is coupled to an X ray tube 84. The second coil 82 receives the input power 78 from the first coil 80 via a magnetic field. The magnetic field is focused onto the second coil 82 by a field focusing element 86 disposed between the first coil 80 and the second coil 82 including at least one resonator configured to focus the magnetic filed onto the second coil 82 upon excitation and form a standing wave current distribution. In one embodiment the field focusing element 86 comprises a rotating field focusing element. Furthermore, the second coil 82 is electrically coupled to a rectifier 88 that converts the AC power from the second coil 82 to a DC power to be used in the X ray tube 84.

The various embodiments of the contactless power transfer system described above include a power source, a first coil, a field focusing element and a second and enable transfer of power via a contactless medium from the first coil to the second coil. The contactless power transfer system enables efficient contactless power transfer between a stationary component and a rotatory component, for example. The contactless power transfer system also maintains the efficiency in case of any deviation in the air gap between the first coil and the second coil. This provides minimum maintenance and higher range of operation to the contactless power system.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, a cycloconverter with respect to one embodiment can be adapted for use with a high voltage transformer described with respect to another embodiment of the invention to provide a contactless power transfer system. Similarly, the various features described, as well as other known equivalents for each feature, may be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for contactless power transfer comprising:
   a first coil mechanically coupled to a first component and electrically coupled to a power source, wherein the first coil is configured to produce a magnetic field;
   a second coil mechanically coupled to a second component and configured to receive power from the first coil via the magnetic field,
   wherein at least one of the first and second components comprises a rotatable component; and
   a field focusing element disposed between the first coil and the second coil and configured as a self resonant coil having a standing wave current distribution to focus the magnetic field onto the second coil and enhance the coupling between the first coil and the second coil.

2. The system of claim 1, further comprising a high frequency converter coupling the power source and the first coil.

3. The system of claim 1, wherein the field focusing element comprises at least one resonator.

4. The system of claim 3, wherein the at least one resonator comprises an axially symmetric structure configured to focus the magnetic field along an axis of rotation.

5. The system of claim 4, wherein the axially symmetric structure comprises a Swiss roll shaped structure, a helical structure or a spiral structure.

6. The system of claim 3, wherein the at least one resonator comprises a plurality of resonators with at least two of the plurality of resonators having different resonant frequencies.

7. The system of claim 6, wherein the different resonant frequencies are configured to enable simultaneous transfer of power and data signals.

8. The system of claim 1, wherein the field focusing element is configured for bi-directional power transfer.

9. The system of claim 3, wherein the at least one resonator is disposed within at least one of a dielectric medium, a magnetic medium, or a magneto-dielectric medium.

10. The system of claim 3, wherein the at least one resonator is configured to focus at least one of an electric field, a magnetic field, or an electromagnetic field.

11. The system of claim 1, wherein the wherein at least one other of the first and second components comprises a stationary component, and wherein the rotatable component is configured to rotate with respect to a stationary component along an axis of rotation.

12. A turbine comprising a contactless power transfer system configured to transfer power to a blade pitch motor from a power generator comprising:
- a first coil coupled to the power generator of the turbine, wherein the first coil is configured to produce a magnetic field,
- a second coil coupled to a blade pitch motor of the turbine and configured to receive power from the first coil via the magnetic field; and
- a field focusing element disposed between the first coil and the second coil comprising at least one resonator configured to focus a magnetic field onto the second coil and form a standing wave current distribution.

13. The turbine of claim 12, wherein the turbine comprises a wind turbine and wherein the field focusing element comprises a rotatable field focusing element.

14. The turbine of claim 12, wherein the at least one resonator comprises an axially symmetric structure configured to focus the magnetic field along an axis of rotation.

15. The turbine of claim 12, wherein the at least one resonator comprises a plurality of resonators with at least one of the resonators configured for excitation in a different phase than at least one other resonator.

16. The turbine of claim 12, further comprising a cycloconverter coupling the second coil and the pitch motor and configured to lower a resonant frequency of the received power.

17. A computed tomography machine comprising a contactless power transfer system configured to transfer power to an X ray tube from a power source comprising:
- a first coil coupled to a high voltage transformer, wherein the first coil is configured to produce a magnetic field,
- a second coil coupled to the X ray tube, wherein the second coil is configured to receive power from the first coil via the magnetic field; and
- a field focusing element disposed between the first coil and the second coil comprising at least one resonator configured to focus a magnetic field onto the second coil and form a standing wave current distribution.

18. The computed tomography machine of claim 17, wherein the field focusing element comprises a rotatable field focusing element.

19. The computed tomography machine of claim 17, wherein the at least one resonator comprises an axially symmetric structure configured to focus the magnetic field along an axis of rotation.

20. The computed tomography machine of claim 17, wherein the at least one resonator comprises a plurality of resonators with at least one of the plurality of resonators being excitable at a different phase than at least one other of the plurality of resonators.

* * * * *